United States Patent [19]

Heider et al.

[11] 4,050,565
[45] Sept. 27, 1977

[54] KEYBOARD CONTROLLED ELECTRONIC EMBOSSING MACHINE

[75] Inventors: Michael Heider, Stutensee; Rainer Eberhard Gürgens, Berlin, both of Germany

[73] Assignee: Adrema Pitney Bowes, Berlin, Germany

[21] Appl. No.: 679,736

[22] Filed: Apr. 23, 1976

[30] Foreign Application Priority Data

Apr. 25, 1975 Germany .............. 2518590

[51] Int. Cl.² ............ B41J 1/22; B41J 3/38
[52] U.S. Cl. .................. 197/6.3; 197/6.5; 197/48
[58] Field of Search ............ 197/6.3–6.7, 197/48, 53–55; 178/34; 318/601, 603, 685

[56] References Cited

U.S. PATENT DOCUMENTS

| | | | |
|---|---|---|---|
| 2,927,676 | 3/1960 | Abbondanza | 197/6.6 |
| 3,227,258 | 1/1966 | Pannier et al. | 197/6.6 |
| 3,294,211 | 12/1966 | Mason | 197/48 |
| 3,586,953 | 6/1971 | Markkanen et al. | 318/685 |
| 3,789,971 | 2/1974 | Deyesso et al. | 318/685 X |
| 3,861,512 | 1/1975 | Coriasco et al. | 197/6.4 X |

*Primary Examiner*—Edgar S. Burr
*Assistant Examiner*—Paul T. Sewell
*Attorney, Agent, or Firm*—Peter Vrahotes; William D. Soltow, Jr.; Albert W. Scribner

[57] ABSTRACT

An electronic embossing machine which utilizes a keyboard controlled die head, which die head bears embossing dies. Electronic means is provided which causes the die head to be rotated over the shortest distance to place the keyboard selected character in the embossing position.

4 Claims, 4 Drawing Figures

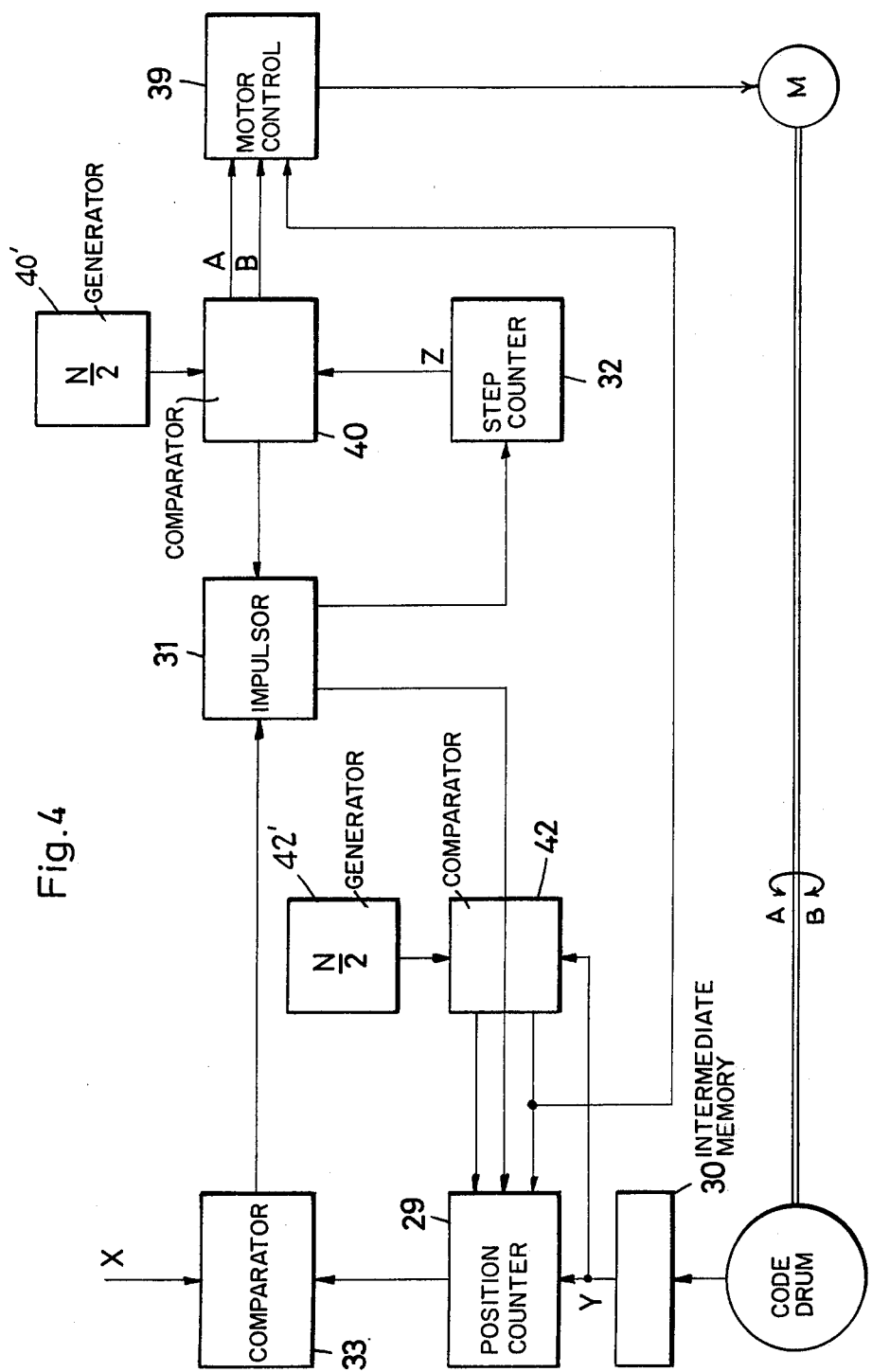

KEYBOARD CONTROLLED ELECTRONIC EMBOSSING MACHINE

BACKGROUND OF THE INVENTION

A keyboard controlled electronic embossing machine of the kind described in copending application having Ser. No. 616,639, which application is assigned to the assignee of this application. The embossing machine comprises a keyboard controlled die head bearing embossing dies. The die head is rotatable in one or the other direction of rotation in order to place into the embossing position the die pair whose character has been selected to be embossed, this placing into position being over the path representing the shortest distance between the die pair last actuated and the die pair next to be actuated. The die head is lockable in the embossing position by means of a brake device. Parts connected to the die head for rotation therewith and a scanning device which is fixed at an angular position are provided under whose influence one of two circuits, which determine the direction of rotation of the die head, is to be closed. When the die which is selected through the keyboard control does not correspond to that die already located in the embossing position, an output signal from the scanning device, which corresponds to the numerical code address of the die already located in the embossing position, and an output signal of the keyboard control, which corresponds to the numerical code address of the die selected by the keyboard, are supplied as input signals to a logic control. This logic control includes a comparator for comparing the input signals and delivering a signal to stop the die head and to trip the embossing operation in the case of coincidence of both the input signals, i.e., when the die selected through the keyboard control has arrived in the embossing position.

SUMMARY OF THE INVENTION

The present invention is characterized by a die position counter which is provided to determine the shortest path of the selected die into the embossing position, i.e., for determining the shortest direction of rotation of the die head. A counting sequence corresponding to coded addresses of the die positions on the periphery of a code drum, or code disk, is carried out by a die position counter which is set according to the embossing position scanned at the code drum. An output signal from the die position counter is supplied to a comparator which has another input corresponding to the die selected through the keyboard control. This comparator is operative to supply a stop signal to an impulsing means when there is coincidence between its input signals. The impulsing means is enabled when the keyboard control is operated and until it receives a stop signals from the comparator. The impulsing means delivers counting impulses on the one hand to the die position counter and on the other hand to a step counter which resulting counter reading is compared with a constant value or the result of a further counting of the step counter in another comparator which determines the direction of rotation of the die head.

The apparatus herein is operated with counters and comparators that have to compare counter readings or constant values. Such control can be established in a simple manner by means of applying modern electronics and they are operated with great reliability. Moreover, the countings are performed with such a speed that the required time for the counting necessary for the embossing control is insignificant. In this way a device is attained which works in a simple, quick and reliable manner for the determination of the shortest path of displacement for the die head in the electronic embossing machine.

It has been found advantageous to choose a constant value corresponding to half the total number of die positions at the die head (i.e., the number of the chambers in which the dies are arranged). In this way the time can be further shortened if a constant value is used for such operation. Namely, in the case of coincidence of the signals which are to be compared, further counting can be omitted as the direction of rotation (for the shortest path for the displacement of the die head) will have already been determined. In the case where coincidence cannot be ascertained before reaching the constant value, i.e., the number corresponding to half the total number of the die positions, the most suitable direction of rotation is already determined. Therefore, only one count is necessary, which has to cover only half of the total number of die positions. The amount of time normally necessary is therefore reduced by half. Moreover, the manner of operation can be achieved by means of a simple circuit arrangement. However, it is also possible that the die position counter counts once in the ascending direction and once in the descending direction under the effect of the counting impulses coming from the impulsing means and through switching over by means of a control logic device. Appropriately, two counts in different directions of counting are successively performed, determined by means of the control logic device, whereby two memories for the storage of the counting results for each count follow the step counter through a gate circuit which can be reversed by the control logic. Furthermore, these follow a comparator which compares the contents of the memories to determine the direction of rotation. Also here, and again without already starting the rotation of the die head at this period, the shortest direction for rotation is determined by means of two counts which complement one another. The results of both counts corresponding to different directions of rotation are kept in two memories. The counter reading is compared and subsequently the direction of rotation is selected which based on the smaller counter reading has a lesser number of steps to be covered for the selected positioning of the die head. Finally, when counters are used to determine the direction of rotation, it is suitable to place the codification of the code addresses for the dies in the die head on the code drum. In this manner, the code addresses of two dies which are associated with the same key of the keyboard control, for instance capital letters and small letters, differ from one another by only one bit, whereas the decoded addresses represent an arithmetic progression in the order of their arrangement. Such an arrangement is very suitable for the operation with countings in order to determine the direction of rotation.

DESCRIPTION OF THE DRAWING

In the drawing, exemplified embodiments of the invention are illustrated.

FIGS. 2 to 4 show three different embodiments of control circuitry to be utilized in conjunction with the electronic embossing machine of FIG. 1, wherein like numbers are used to identify like parts.

DETAILED DESCRIPTION OF THE INVENTION

Figure 1:
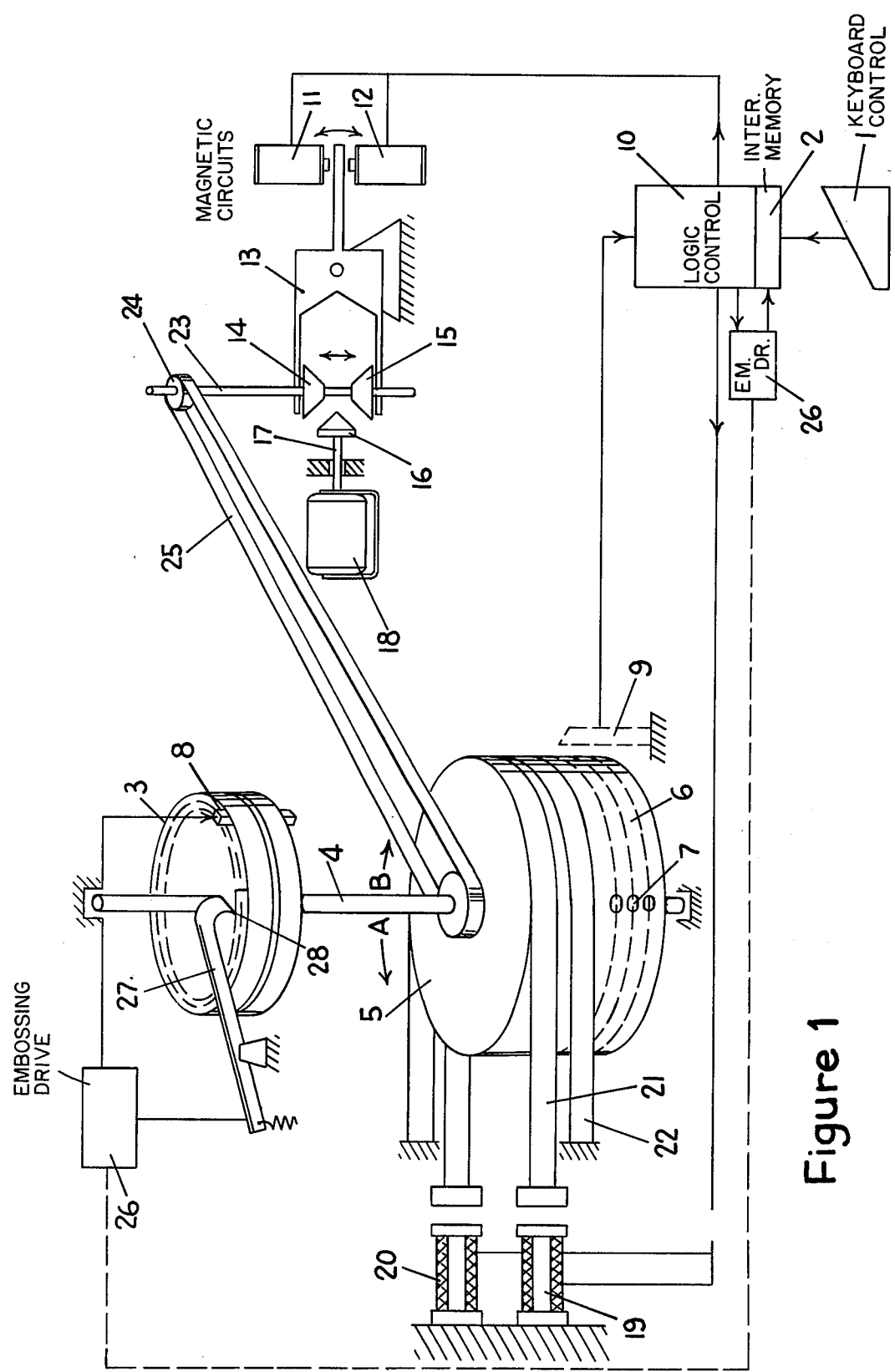
FIG. 1 shows an electronic embossing machine which may utilize the principles of the present invention and is shown in a partially perspective and partially schematic view.

Referring now to the drawing, FIG. 1 shows an electronic embossing machine having an electronic keyboard control 1. The die which is selected at the keyboard control 1, which character is to be embossed, is digitally predetermined by the operation of a key of the keyboard control 1 and stored in an intermediate memory 2. A die head 3 which is mounted on a driving shaft 4 carries the dies 8 whose characters are to be embossed. A brake drum 5 and a code drum 6 are mounted on the driving shaft 4 for rotation therewith. The circumference of the code drum 6 is provided with punch marks 7 which correspond to the code addresses of the dies 8 on the die head 3. The code drum 6 is scanned by means of a scanning device 9 whose output signal is delivered to a logic control 10 which receives the output signal from the intermediate memory 2 and ascertains the difference between these signals. The logic control 10 controls the embossing machine through the magnetic circuits 11, 12 which determine the direction of rotation of the rotating unit, consisting of the die head 3 and the code drum 6, through a rocker 13, clutch disks 14, 15 and a friction gear 16 which is mounted on the shaft 17 of a drive motor 18.

Electromagnets 19, 20, together with the band brakes 21, 22, serve to stop the drive to the code drum 6, which drive is provided through the shaft 23, the belt pulley 24, and the V-belt 25, in order to stop the die head 3 at the correct embossing position. In this position an embossing drive 26 is actuated through the logic control 10 and simultaneously a pawl 27 engages an appropriate marginal aperture 28 in the die head 3, thereby ensuring the exact embossing position for the die which character is to be embossed.

Reference may be had to the previously mentioned copending application having Ser. No. 616,639 for a more detailed description of the apparatus shown in FIG. 1.

Figure 2:
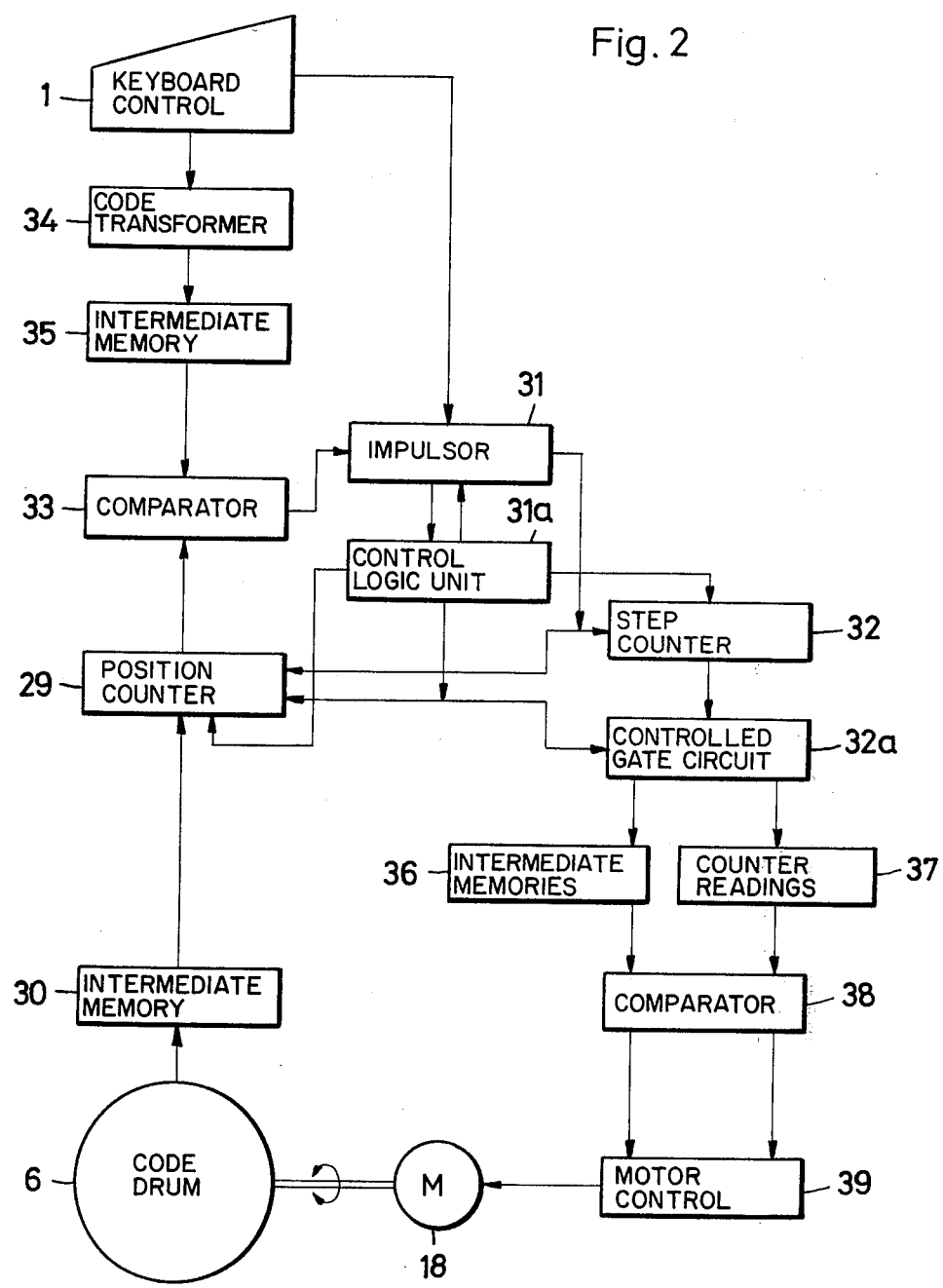

Referring now to FIG. 2, an embodiment of the control circuit in which the evaluation of the most suitable direction of rotation is accomplished by way of a simple counting of the steps from the die in the embossing position to the die selected at the keyboard for the next embossing operation. This works as follows:

After the respective key of the keyboard control device 1 for the die which character is to be embossed has been actuated, a die position counter 29 receives through an intermediate memory 30 the code address of the code disk or code drum 6 which corresponds to the die located in the embossing position. Simultaneously, an impulsing means 31 is triggered and delivers timing impulses to the die position counter 29 and step counter 32, these impulses being counted by both counters. The die position counter 29, counts initially in the direction of the ascending values. The code addresses which are continuously fed to the comparator 33 through the die position counter 29 are compared with the code address of the die selected through the keyboard control device 1 which character is to be embossed and which code address is offered to the comparator 33 from the keyboard control 1 through a code transformer 34 and an intermediate memory 35. In the case of coincidence, the impulsing means 31 is stopped. The counter reading of the step counter 32 now corresponds to the number of steps made until coincidence of the values offered to the comparator 33 and the die position counter 29 have been obtained. This counter reading is supplied to an intermediate memory 36 through a gate circuit 32a.

In response to a control logic unit 31a, a further counting begins. For this purpose the control logic unit 31a sets the step counter 32 to zero and triggers again the impulsing means 31. Simultaneously, the die position counter 29 is set back in order to be able to indicate again a counter reading which corresponds to the code address of the die located in the embossing position. Starting at this basic counter reading, the die position counter 29, now under the control of the control logic unit 31a, counts in the reverse direction of counting the timing impulses (steps) received from the impulsing means 31. Therefore, the counting at the die position counter 29 is performed in the direction of the descending values. The counting is continued until the comparator 33 obtains coincidence of the received code addresses and a stop signal is supplied to the impulsing means 31. Under the effect of the control logic unit 31a, the number of the necessary steps, i.e., the counter reading of the step counter 32, is supplied to an intermediate memory 37 through the controlled gate circuit 32a. The intermediate memories 36, 37 now store the counter readings which indicate the required number of steps according to the direction of counting or rotation. In the comparator 38, the contents of the memories 36, 37 are compared. The comparator 38 has two outputs to a motor control unit 39 of the drive motor 18 for the code drum 6. The smaller number of steps in the intermediate memories 36, 37 determines which of the two outputs is to be controlling i.e., which of the two circuits 11, 12 (FIG. 1) is to be closed. One of these corresponds to a left turn and the other to a right turn of the drive motor 18 as indicated in the drawing by means of the double arrow. Through the drive control unit 39, the code drum 6 and therewith the die head 3 start a rotation in the direction which moves the die selected at the keyboard control device 1 over the shortest distances into the embossing position.

Figure 3:
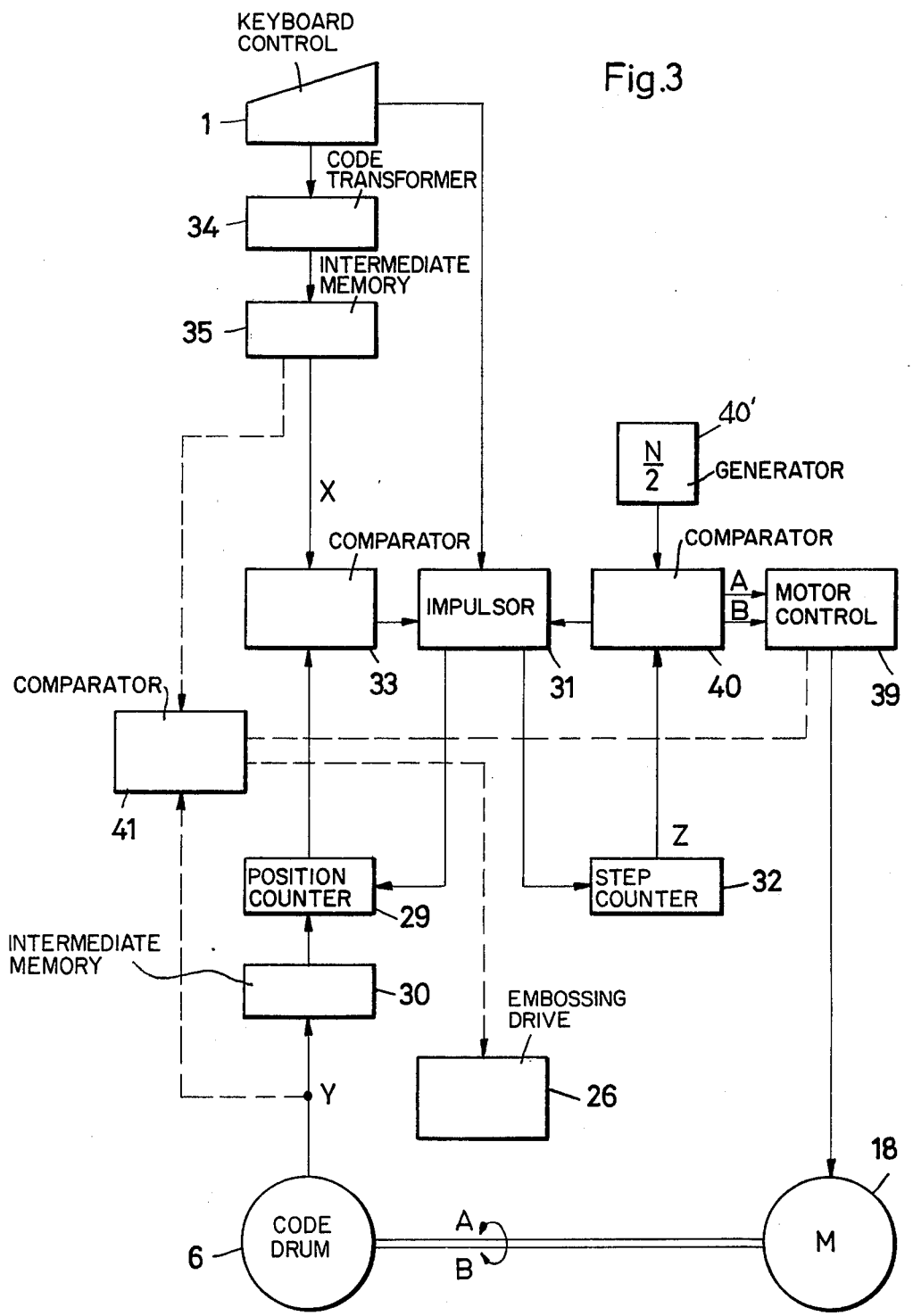

FIG. 3 shows another embodiment of the invention shown and illustrated in FIG. 2 and described above.

After the respective key of the keyboard control 1 for the character to be selected or the die to be embossed, has been actuated, the die position counter 29 is set through the code drum 6 and through the intermediate memory 30 to a respective code address "y" corresponding to the momentary position of the die head 3. These code addresses which are associated with respective embossing dies 8 are coded numbers which are progressively arranged according to their values, for instance, 1, 2, 3, 4 . . . to N. The impulsing means 31 is also enabled and impulses are counted in the die position counter 29 and the step counter 32. The die position counter 29 may count, for example, in the ascending direction which corresponds to the direction of rotation "A" for the die head 3. In the comparator 33, the coded counter readings of the die position counter 29 are continuously compared with the code address corresponding to the die to be controlled through the code transformer 34, and kept in the intermediate memory 35.

In the case of coincidence of both these numerical values the impulsing means 31 is stopped. Up to this point, this embodiment works in the same way as the embodiment according to FIG. 2 which is described above. However, the counter reading of the step counter 32, i.e., the number of the steps "z", now is compared with a constant value supplied to the comparator 40 through a reference signal generator 40'. "N"/2 is chosen as a constant value, N being the number of the possible positions of the die head 3. When the number of the steps z is less than N/2 the shortest distance will be obtained by rotating of the die head 3 in the direction A. In the case that the number of the steps z is more than N/2, the reverse direction of rotation B has to be selected in order to attain the shotest direction of rotation. In the case that z equals N/2, an arbitrary direction of rotation is selected. The controlling of the drive motor 18 of the code drum 6 is achieved by means of the motor control 39 as described above. For this, a comparator 41 can be provided which produces a signal for stopping the drive motor 18 or to disable the supply circuits 11, 12 (FIG. 1) and for starting the embossing operation through the embossing drive 26 in the case that a coincidence is obtained between the values of the selected die head position and the actual die head position ($x = y$).

The device can be further improved and an additional time saving may be attained, in the case where the impulsing means 31 is stopped with the number of the steps $x$ has attained the value N/2. For, at this moment, the most suitable direction of rotation has already been decided. Namely in the case the comparator 33 ascertains coincidence before the value N/2 is reached, this means that the direction of rotation A is more suitable. In the case that the coincidence is not attained before the counter reading of the step counter 32 comes up to N/2, the most suitable direction of rotation must be B.

For both of the preselection methods for the respective direction of rotation, the die position counter 29 has to be additionally controlled by suitable means in such a way that its counting sequence completely corresponds with the order of the values of the dies 8 at the code drum 6. This occurs, for example, by setting back the die position counter 29 to the minimum value of the used code addresses when the counter reading has reached the maximum value of the code addresses of the code drum 6 or by setting ahead the die position counter 29 when possible skips occur in the successive order of the values of the code addresses.

FIG. 4 shows an embodiment in which such "skipping" of the die position counter 29 is avoided. Herein a comparator 42 is provided which receives a constant value N/2 from a reference signal generator 42' and ascertains whether the value of the code address $y$, to which the die position counter 29 has been set in the beginning of the determination of the direction of rotation, is more or less than N/2. In the case that the comparator 42 ascertains that the code address $y$ is less than N/2 it will proceed as described above. In the case, however, the comparator 42 ascertains that the code address $y$ is more than N/2, the die position counter 29 counts in reverse direction, i.e., corresponding to the direction of rotation B which is controlled through the impulsing means 31 and the comparator 42. A determination of the direction which has to be chosen is given by the motor control 39 as follows:

1. a direction of rotation A is selected in the case that $y$ is $<N/2$ and $z <N/2$ or $y$ is $>N/2$ and $z >N/2$;

2. a direction of rotation B is selected in the case that $y$ is $<N/2$ and $z >N/2$ or $y$ is $>N/2$ and $z <N/2$.

Where: $y$ = the code address of the die in the embossing position; $z$ = the number of steps required for coincidence between $y$ and the code address of the die to be placed in the embossing position, and N = the total number of die positions on the die head.

What is claimed is:

1. In an electronic embossing machine of the type having a keyboard which determines the character to be embossed, a memory electronically connected to the keyboard to receive information therefrom and store such information, a logic controller connected to the memory for receiving information and to inform the logic controller as to the character selected by the keyboard, a drum rotatably supported upon a rotatable shaft which has a plurality of numerically arranged code addresses about its perimeter, a scanner adjacent to the drum for reading the code addresses, the scanner being electrically connected to the logic controller for supplying information to the logic controller as to the code address being read, a die head rotatably mounted on the shaft and bearing a plurality of dies thereon which have characters corresponding to the code addresses on the drum, brake means electrically connected to the logic controller and operative to brake the shaft upon receipt of a signal from the logic controller, and drive means operatively controlled by the logic controller and connected to the shaft for rotation thereof in either direction upon receipt of a signal from the logic controller to rotatably displace a keyboard selected die to the embossing position, the improvement residing in the logic controller having control means for selecting the shortest direction of rotation of the die head to locate a selected die in the embossing position, the control means comprising:

an intermediate memory electrically connected to the code drum;

a die position counter electrically connected to said intermediate memory to receive the code address of the die in the embossing position;

a first comparator electrically connected to said die position counter and to the memory associated with the keyboard to receive and compare a code address signal and a character select signal respectively;

an impulsing means electrically connected to the keyboard and said first comparator;

a control logic unit electrically connected to said impulsing means and said die position counter;

a step counter electrically connected to said impulse means, said control logic unit and said die position counter;

a gate circuit electrically connected to said step counter, said control logic and said die position counter;

a pair of intermediate memories, each being electrically connected to said gate circuit, a second comparator electrically connected to said intermediate memories; and a drive control circuit electrically connected to the intermediate memories and the drive means, whereby, upon selection of a character of the keyboard control, said die position counter receives, through said intermediate memory, the code address corresponding to the die located in the embossing position and supplies such code address to said first comparator;

said impulsing means is enabled to deliver timing impulses to said die position counter and said step counter, each of which commence counting such impulses;

said first comparator compares the code address of the character selected through the keyboard control with the code address received from said die position counter until coincidence is obtained wherein said impulsing means is disabled;

said step counter counts the number of steps made by said impulsing means to reach said coincidence and supplies said number to a first of said pairs of intermediate memories through said gate circuit;

said control logic unit sets said step counter to zero and again triggers said impulsing means to count in the reverse direction of the first count;

said control logic unit enables the die position counter to count in the reverse direction timing impulses received from said impulsing means until said first comparator evaluates coincidence between the signal received from the keyboard control and said die position counter whereupon said impulsing means is disabled;

said step counter counts the steps of said die position counter in the reverse direction and supplies a corresponding signal to the second of said paired intermediate memories;

said pair of intermediate memories supply such respective counter readings to said second comparator;

said second comparator upon receiving the contents of said paired memories, delivers a pair of signals to said drive control circuit;

said drive control circuit selects the smaller number of steps represented by said pair of signals and enables the drive means to drive the die head in the selected direction in proportion to the signal selected by said drive control circuit; and said motor control sends an enabling signal to the brake means when the selected die is located in the embossing position to terminate rotation of the die head.

2. In an electronic embossing machine of the type having a keyboard which determines the character to be embossed, a memory electronically connected to the keyboard to receive information therefrom and store such information, a logic controller connected to the memory for receiving information and to inform the logic controller as to the character selected by the keyboard, a drum rotatably supported upon a rotatable shaft which has a plurality of numerically arranged code addresses about its perimeter, a scanner adjacent to the drum for reading the code addresses, the scanner being electrically connected to the logic controller for supplying information to the logic controller as to the code address being read, a die head rotatably mounted on the shaft and bearing a plurality of dies thereon which have characters corresponding to the code addresses on the drum, brake means electrically connected to the logic controller and operative to brake the shaft upon receipt of a signal from the logic controller and drive means operatively controlled by the logic controller and connected to the shaft for rotation thereof in either direction upon receipt of a signal from the logic controller to rotatably displace a keyboard selected die to the embossing position, the improvement residing in the logic controller having control means for selecting the shortest direction of rotation of the die head to locate a selected die in the embossing position, the control means comprising:

an intermediate memory electrically connected to the code drum;

a die position counter electrically connected to said intermediate memory to receive the code address of the die in the embossing position;

a first comparator electrically connected to said die position counter and to the memory associated with the keyboard to receive and compare a code address signal and a character select signal respectively;

an impulsing means electrically connected to the keyboard and said first comparator;

a step counter electrically connected to said impulse means;

a second comparator electrically connected to said impulse means and said step counter;

a reference signal generator electrically connected to said second comparator; and a drive control circuit electrically connected to said second comparator memories and the drive means, whereby, upon selection of a character of the keyboard control, said die position counter receives, through said intermediate memory, the code address corresponding to the die located in the embossing position and supplies such code addresses to said first comparator, said impulsing means is enabled to deliver timing impulses to said die position counter and said step counter, each of which commence counting such impulses, said first comparator compares the code address of the character selected through the keyboard control with the code address received from said die position counter until coincidence is obtained wherein said impulsing means is disabled;

said step counter counts the number of steps made by said impulsing means to reach said coincidence and supplies said number to said second comparator;

said reference signal generator supplies a reference signal to said second comparator;

said second comparator upon receiving the signals from said step counter and said reference signal generator compares the two signals and sends the signal representing the shortest distance of rotation of the die head to said drive control circuit; and said drive control circuit enables the drive means to drive the die head in the selected direction in proportion to the signal selected by said drive control circuit.

3. The electronic embossing machine of claim 2 including a comparator electrically connected to said keyboard memory, said code drum, said brake means, said step counter and said motor control which produces a signal in response to the impulses counted in said step counter and supplies a brake signal to the brake means upon the selected die reaching the embossing position.

4. In an electronic embossing machine of the type having a keyboard which determines the character to be embossed, a memory electronically connected to the keyboard to receive information therefrom and store such information, a logic controller connected to the memory for receiving information and to inform the logic controller as to the character selected by the keyboard, a drum rotatably supported upon a rotatable shaft which has a plurality of numerically arranged code addresses about its perimeter, a scanner adjacent to the drum for reading the code addresses, the scanner being electrically connected to the logic controller for supplying information to the logic controller as to the code address being read, a die head rotatably mounted on the shaft and bearing a plurality of dies thereon which have characters corresponding to the code addresses on the drum, brake means electrically connected to the logic controller and operative to brake the shaft upon receipt of a signal from the logic controller, and drive means operatively controlled by the logic controller and connected to the shaft for rotation thereof in either direction upon receipt of a signal from the logic controller to rotatably displace a keyboard selected die to the embossing position, the improvement residing in the logic controller having control means for selecting the shortest direction of rotation of the die head to locate a selected die in the embossing position, the control means comprising:
- an intermediate memory electrically connected to the code drum;
- a die position counter electrically connected to said intermediate memory to receive the code address of the die in the embossing position;
- a first comparator electrically connected to said die position counter and to the memory associated with the keyboard to receive and compare a code address signal and a character select signal respectively;
- an impulsing means electrically connected to said first comparator and to said die position counter,
- a second comparator electrically connected to said impulsing means;
- a first reference signal generator electrically connected to said second comparator that supplies a signal $N/2$ to said second comparator which represents half the number of code address position on the die head;
- a step counter electrically connected to said impulse means and said second comparator;
- a third comparator electrically connected to said die position counter,
- a second reference generator electrically connected to said third comparator to send a signal $N/2$ thereto and
- a drive control circuit electrically connected to said second and third comparators and the drive means, whereby, upon selection of a character of the keyboard control,
- said third comparator receives, through said intermediate memory, the code address $y$ corresponding to the die located in the embossing position and an $N/2$ signal from said second reference signal whereupon a comparison is made between $y$ and $N/2$, said die position counter counts in a first direction when $y$ is less than $N/2$ and in the reverse direction when $y$ is greater than $N/2$;
- said impulsing means is enabled to deliver timing impulses to said die position counter and said step counter, each of which commence counting such impulses;
- said first comparator compares the code address of the character selected through the keyboard control with the signal received from said die position counter until coincidence is obtained wherein said impulsing means is disabled;
- said step counter counts the number of steps made by said impulsing means to reach said coincidence and supplies said count $z$ to said second comparator;
- said first reference signal generator sends a reference signal $N/2$ to said second comparator;
- said second comparator upon receiving the contents of said first reference signal generator and said step counter delivers a signal to said drive control circuit and said third comparator sends a signal to said drive control circuit whereby
- said drive control circuit controls the drive means to rotate the die head in a first direction when $y$ is less than $N/2$ and $z$ is less than $N/2$ or $y$ is greater than $N/2$ and $z$ is greater than $N/2$ and in the reverse direction when $y$ is less than $N/2$ and $z$ is greater than $N/2$ or $y$ is greater than $N/2$ and $z$ is less than $N/2$.

* * * * *